(12) United States Patent
Alexander et al.

(10) Patent No.: US 7,987,343 B2
(45) Date of Patent: Jul. 26, 2011

(54) PROCESSOR AND METHOD FOR SYNCHRONOUS LOAD MULTIPLE FETCHING SEQUENCE AND PIPELINE STAGE RESULT TRACKING TO FACILITATE EARLY ADDRESS GENERATION INTERLOCK BYPASS

(75) Inventors: Khary J. Alexander, Poughkeepsie, NY (US); Fadi Y. Busaba, Poughkeepsie, NY (US); Vimal M. Kapadia, New York City, NY (US); Chung-Lung Kevin Shum, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 615 days.

(21) Appl. No.: 12/051,527

(22) Filed: Mar. 19, 2008

(65) Prior Publication Data
US 2009/0240919 A1 Sep. 24, 2009

(51) Int. Cl.
*G06F 9/40* (2006.01)
*G06F 9/30* (2006.01)
(52) U.S. Cl. ....................... 712/218; 712/208
(58) Field of Classification Search .................. 712/218, 712/208
See application file for complete search history.

(56) References Cited

U.S. PATENT DOCUMENTS

| | | | |
|---|---|---|---|
| 5,416,911 | A | 5/1995 | Dinkjian et al. |
| 5,867,684 | A | 2/1999 | Kahle et al. |
| 6,138,223 | A | 10/2000 | Check et al. |
| 6,671,794 | B1 | 12/2003 | Giamei et al. |
| 2006/0095678 | A1 | 5/2006 | Bigelow et al. |

OTHER PUBLICATIONS

"Efficient Handling of Load Multiple Instruction", IBM Technical Disclosure Bulletin, Sep. 1982, US.*
"Use of Load Bypass on Load Multiple Instruction to Reduce Address Generation Interlock Delays", IBM Technical Disclosure Bulletin, Oct. 1982, US.*
z/Architecture. "Principles of Operation". Sixth Edition (Apr. 2007). IBM. 1218 pages.

* cited by examiner

*Primary Examiner* — Alford W Kindred
*Assistant Examiner* — Jesse R Moll
(74) *Attorney, Agent, or Firm* — Cantor Colburn LLP; John Campbell

(57) ABSTRACT

A pipelined processor including an architecture for address generation interlocking, the processor including: an instruction grouping unit to detect a read-after-write dependency and to resolve instruction interdependency; an instruction dispatch unit (IDU) including address generation interlock (AGI) and operand fetching logic for dispatching an instruction to at least one of a load store unit and an execution unit; wherein the load store unit is configured with access to a data cache and to return fetched data to the execution unit; wherein the execution unit is configured to write data into a general purpose register bank; and wherein the architecture provides support for bypassing of results of a load multiple instruction for address generation while such instruction is executing in the execution unit before the general purpose register bank is written. A method and a computer system are also provided.

18 Claims, 3 Drawing Sheets

Fig. 2

| Cycles | | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| No Bypassing | >3,4 | Disp | AGEN | Access | | Ex | Eval | Write | GRP | | | | | | | |
| | >5,6 | | | | Access | | Ex | Eval | Write | GRP | | | | | | |
| | >7,8 | | | | | Access | | Ex | Eval | Write | GRP | | | | | |
| LM | >9 | | | | | | Access | | Ex | Eval | Write | GRP | | | | |
| =15 Cycles | Victim | | | | | | | | | | | | | | | |
| | <7 | Dep | Dep | Dep | Dep | Dep | Dep | Dep | Dep | Dep | Disp | AGEN | Access | | Ex | Comp |

--PRIOR ART--

Fig. 3

| Cyle | 1 | 2 | 3 | 4 | 5 | 6 | 7 | 8 |
|---|---|---|---|---|---|---|---|---|
| Data fetched | S | S+16 | S+32 | - | S+48 | - | - | - |
| Bytes returned | 0-7 | 8-15 | 16-23 | 24-31 | 32-39 | 40-47 | 48-55 | 56-63 |

Fig. 4

| Cyle | 1 | 2 | 3 | 4 | 5 | 6 | 7 | 8 | 9 | 10 |
|---|---|---|---|---|---|---|---|---|---|---|
| Data fetched pipe0 | S | S+16 | S+32 | S+48 | S+64 | - | S+96 | - | S+128 | - |
| Data fetched pipe1 | - | - | - | - | S+80 | - | S+112 | - | - | - |
| Bytes returned pipe0 | 0-7 | 8-15 | 16-23 | 24-31 | 32-39 | 48-55 | 64-71 | 80-87 | 96-103 | 112-119 |
| Bytes returned pipe1 | | | | | 40-47 | 56-63 | 72-79 | 88-95 | 104-111 | 120-127 |

Fig. 5

| Cycles | | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| No Bypassing | LM >3,4 | Disp | AGEN | Access | Access | Ex | Eval | Write | GRP | | | | | | | |
| | LM >5,6 | | | | Access | Access | Ex | Eval | Write | GRP | | | | | | |
| | LM >7,8 | | | | | | Access | Access | Ex | Eval | Write | GRP | | | | |
| | LM >9 | | | | | | | | AGEN | Ex | Eval | Write | GRP | | | |
| =12 Cycles | Victim <7 | Dep | Dep | Dep | Dep | Dep | Dep | Dep | Dep | Dep | Dep | Dep | Comp | | | |

Fig. 6

| Cycles | | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| LMG 1,1,1,1,3 pattern | LM >3 | Disp | AGEN | Access | Access | Ex | Eval | Write | GRP | | | | | | | |
| | LM >4 | | | | Access | Access | Ex | Eval | Write | GRP | | | | | | |
| | LM >5 | | | | | Access | Access | Ex | Eval | Write | GRP | | | | | |
| | LM >6 | | | | | | Access | Access | Ex | Eval | Write | GRP | | | | |
| | LM >7,8 | | | | | | | Access | Disp | AGEN | Ex | Eval | Write | GRP | | |
| | LM >9 | | | | | | | | | | AGEN | Access | Access | Ex | GRP | |
| =12 Cycles | Victim <7 | Dep | Dep | Dep | Dep | Dep | Dep | Dep | Dep | Dep | Dep | Dep | Dep | Dep | Ex | Comp |

PROCESSOR AND METHOD FOR SYNCHRONOUS LOAD MULTIPLE FETCHING SEQUENCE AND PIPELINE STAGE RESULT TRACKING TO FACILITATE EARLY ADDRESS GENERATION INTERLOCK BYPASS

BACKGROUND OF THE INVENTION

This invention relates to high performance computer systems, and particularly to Address Generation Interlock (AGI) support in microprocessors that execute a instruction set, usually a complex instruction set computer (CISC) instruction set, which includes multi-cycle instructions that load a number of general purpose registers.

In the art of microprocessor design, one technique to improve performance is the use of "pipelining." Pipelines improve performance by allowing a number of instructions to work their way through the microprocessor at the same time.

Consider that most processors run programs by loading an instruction from memory; decoding the instruction; loading associated data from registers or memory that is needed to process the instruction; processing the instruction; and storing any associated results in registers or memory. Pipelines are usually characterized in terms of their depth (N) (i.e. processing stages) with N=5 in this case. Complicating this series of steps is the fact that access to the memory, which includes a memory hierarchy that can be made up of caches, main memory (i.e., random access memory) and other memory such as non-volatile storage like hard disks, (not shown) involves a lengthy delay (in terms of processing time/cycles).

If each of these steps of running programs is implemented as a pipeline stage, then the microprocessor may start to decode a new instruction while an older instruction waits for results to continue. This permits up to N instructions to be "in flight" at one time, making the microprocessor appear to be up to N times as fast. Although any one instruction takes just as long to complete (there are still N steps) the microprocessor as a whole "retires" instructions much faster. Since each stage involves less work, and thus requires less time, a processor with more stages can usually be run at a higher clock speed.

Multiple instructions can occupy different stages in an execution unit at the ideal back-to-back rate leading to increased throughput and overall performance. While effective, pipelining is unfortunately limited by two major factors. A first factor is an extent that the pipeline can be supplied with new instructions to process and is essentially a factor of restart (e.g. branch wrong, exception conditions including I/O interrupts) penalties. A second factor is the amount of resource interdependency in the instruction stream.

With regard to the second factor, consider that during processing an operation for an instruction in one stage (i.e., a "consumer") of the pipeline may be dependent on results from another instruction (i.e., a "producer"). The other instruction may be an earlier instruction, executing in a later stage of the pipeline. Ideally, results are produced and available for consumption when needed, otherwise, the pipeline will suffer a stall at the point of the consumption until the results are ready. As an example, cycles between the producer and the consumer of the result should be occupied by operations of other independent instructions such that the pipeline stages are all filled and the result is ready when it is needed. Modern compilers employ instruction re-ordering techniques to improve the spacing of dependent instructions, but this is limited by the instruction stream (within a software program) itself.

Instructions that occupy or update multiple resources are the most likely to cause interdependencies which adversely affect performance since their corresponding operations tend to be longer. One example of such an instruction is a Load Multiple (LM) type of instruction which writes a plurality of General Purpose Registers (GPRs) using data located in a range of sequential addresses. Because the data fetching sequence can be potentially long and involves a large number of registers, known solutions in this area involve only tracking the updates of actual architectured registers representing the GPRs. Tracking of the GPR updates permits the dispatch of younger dependent instructions only when the results are available in the GPR. Tracking may be accompanied by use of Address Generation Interlock (AGI) techniques to delay the consumer instruction(s) in the Address generation (AGEN) stage until the data is available in the GPR.

Address Generation Interlock (AGI) detects and resolves read-after-write (RAW) dependencies where an instruction writes a general purpose register, which is later read by a younger instruction. The younger instruction may access the general purpose register during an address generation (AGEN) stage to provide value required to calculate the operand address for operand access. In a typical microprocessor pipeline, the address generation stages are usually earlier and possibly decoupled from the execution stages. Therefore, an AGI penalty may be realized where younger instruction's operand address generation becomes dependent on older instruction's execution write back. It is also common in a in-order pipelined microprocessor that the actual GPR update is performed some pipeline stages after their intended update values are calculated during execution. One such reason is because an in-order processor does not have renaming capability, and such updates, even with results ready, need to only happen when the execution path is confirmed to be unconditional, i.e., it is not under any unresolved branches. It is these cases where results are ready, the ability of bypassing results to a consuming address generation stage before the GPRs are written becomes very important for performance. In a microprocessor where long or complex instructions are not cracked into individual micro-instructions during decode or dispatch, such as for LM-type instructions, there is added complexity in tracking and supporting the bypass of individual GPR updates during execution to address generation.

Therefore, what are needed are techniques for improving result handling in a microprocessor. Preferably, the techniques provide for reduction of stall or wait conditions by facilitating earlier use of instruction results.

BRIEF SUMMARY OF THE INVENTION

The shortcomings of the prior art are overcome and additional advantages are provided through the provision of a pipelined processor including an architecture for address generation interlocking, the processor including: an instruction grouping unit to detect a read-after-write dependency and to resolve instruction interdependency; an instruction dispatch unit (IDU) including address generation interlock (AGI) and operand fetching logic for dispatching an instruction to at least one of a load store unit and an execution unit; wherein the load store unit is configured with access to a data cache and to return fetched data to the execution unit; wherein the execution unit is configured to write data into a general purpose register file; and wherein the architecture provides support for bypassing of results of a load multiple instruction for address generation while such instruction is executing in the execution unit before the general purpose register bank is written.

In another embodiment, a method for bypassing address generation interlocking (AGI) in a processor is disclosed and includes: at least one of detecting a read-after-write dependency and resolving instruction interdependency; dispatching an instruction to at least one of a load store unit and an execution unit; accessing a data cache and to returning fetched data from the data cache; and bypassing result data to satisfy address generation dependencies before writing data updates into a general purpose register file.

In another embodiment, a computer system including a pipelined processor including an architecture for address generation interlocking, that includes: an instruction grouping unit to detect a read-after-write dependency and to resolve instruction interdependency; an instruction dispatch unit (IDU) including address generation interlock (AGI) and operand fetching logic for dispatching an instruction to at least one of a load store unit and an execution unit; wherein the load store unit is configured with access to a data cache and to return fetched data to the execution unit; wherein the execution unit is configured to write data into a general purpose register file; and wherein the architecture provides support for bypassing of results of a load multiple instruction for address generation while such instruction is executing in the execution unit before the general purpose register bank is written.

BRIEF DESCRIPTION OF THE DRAWINGS

Referring now to the drawings wherein like elements are numbered alike in the several figures, wherein:

FIG. 2 illustrates a prior art solution which tracks only actual GPR writes;

FIG. 3 illustrates one example of a fetch and return pattern according to the present invention;

FIG. 4 illustrates another example of a fetch and return pattern according to the present invention;

FIG. 5 illustrates a first example according to the present invention where accurate pipeline tracking enabling early AGI bypass is included; and FIG. 6 illustrates a second example according to the present invention where accurate pipeline tracking enabling early AGI bypass.

DETAILED DESCRIPTION OF EXEMPLARY EMBODIMENTS

Figure 1:
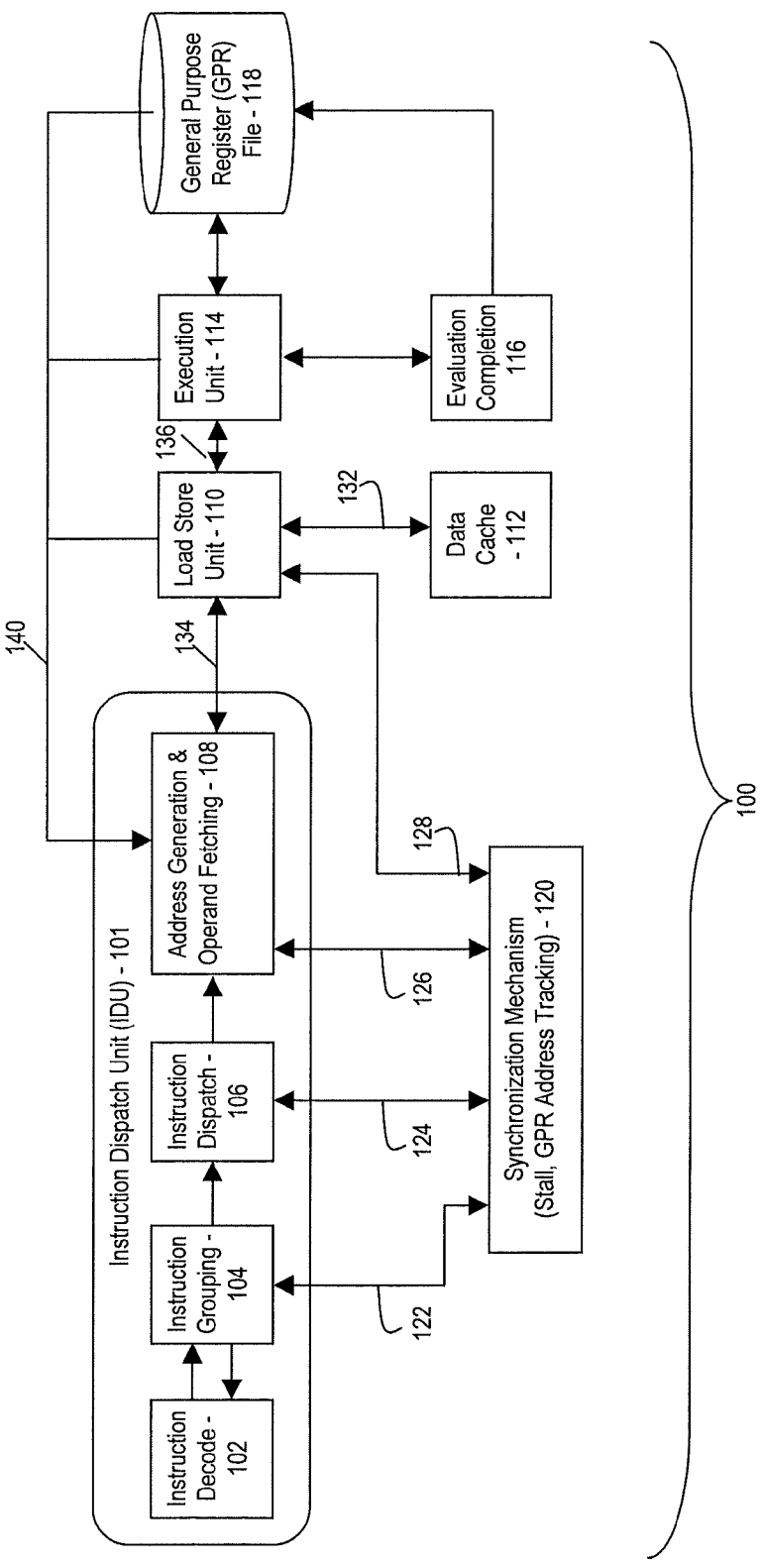
FIG. 1 illustrates a block diagram of aspects of a microprocessor upon which a synchronous Load Multiple AGI bypass mechanism may be practiced without the use of an early register file.

The teachings herein provide a mechanism to track and early bypass Load Multiple (LM) type instructions for general purpose register (GPR) updates. This includes operand accesses (such as Opfetch) involving address generation (AGEN), fetching through a local cache, and formatting returns of the fetched data in a predictable pattern. This pattern is replicated in an address generation interlock (AGI) tracking mechanism through instruction expansion, thus allowing early bypassing of GPR update values into AGEN stages before they are committed into the GPR. In various embodiments, the fetching and tracking patterns differ, such as between variants of LM instructions. For instance, in one embodiment, there is a Load Multiple Grand (LMG) variant that loads a double word (DW) into each register, whereas a base LM loads only the lower word (32 bits) of each GPR. Generally, throughout the sequence, the Opfetch and register tracking mechanisms are kept in lockstep via stall broadcasting.

In particular, the teachings herein provide for mirroring/synchronization of an AGI mechanism with the complex fetching sequences. However, the fetching sequences themselves are unique and optimized for each particular ISA and micro-architecture (e.g. gaps in the fetching pattern, which access local data caches, to allow for buffered stores to be committed into the cache array within those gaps).

In general, and for perspective, the load multiple (LM) instruction loads N consecutive words starting at a calculated effective address (EA) into a number of general-purpose registers (GPR). For example, if a GPR is defined as a 32 bit register, a LM instruction may load into the GPR starting at GPR RT (RT being the starting target general-purpose register number for this operation) and fills all GPRs through GPR 31. In this embodiment, N is equal to 32-RT field, the total number of consecutive words that are placed in consecutive registers.

Turning now to FIG. 1, a system 100 is depicted for implementing the teachings herein. The system 100 includes multiple functional units to support pipelining of instructions in processing circuitry. Pipelining can increase instruction execution throughput by performing stages such as fetching, decoding, execution and completion concurrently for multiple instructions in an instruction stream. In an exemplary embodiment, functional units in the system 100 include: an instruction decode unit 102, an instruction grouping unit 104, an instruction dispatch unit 106, an address generation unit 108, a load store unit 110, which includes an interface with a data cache element 112, execution unit 114, an evaluation/completion unit 116, GPR element 118, and Synchronization unit 120. It will be understood that additional functional units can be included in the system 100 which are not depicted, such as an instruction fetching unit, a recovery unit, and various kinds of execution units. Multiple communication paths can be used to communicate between each of the functional units 102-120. The communication paths may vary in bus width (single-bit to multi-bit) and can be unidirectional or bidirectional. The instruction grouping 104 can create read-after-write (RAW) GPR based dependencies on older store instructions that have progressed into later pipeline stages (e.g., in functional units 106-110, 114-118). In an exemplary embodiment, the instruction dispatcher 106 delays dispatching of a consumer instruction when an older instruction producing results needed by this younger instructions has been identified by the AGI logic in the Synchronization mechanism 120. Alternatively, delaying of an instruction can be performed in the instruction decoder 102 or instruction grouping 104. The instruction dispatcher 106 dispatches instructions (as indicated in the instruction text image, i.e. itext), once dependencies have been satisfied, per the AGI logic in 120 to address generator 108. The address generator 108 determines actual address values, which may be calculated using a combination of base, index, and displacement fields specified by the itext in the instruction stream. The address generator 108 sends itext (including various forms of interfaces based on itext) with operand address information to the load store unit.

The Load Store Unit (LSU) 110 can access a data cache 112 and receive data from the data cache 112 via path 132. In an exemplary embodiment, the LSU 110 can feed information back to the address generator 108 via path 134, and forward information to the execution unit 114 via path 136. Such information mostly include the operand data that is being accessed and can possibly be bypassed before it is received in the execution unit 114. The execution unit 114 can also send data to the load store unit 110 via path 136, with such information mostly including storage update data. The execution unit 114, together with GPR 118, can also send information back to the address generation and operand fetching 108 via path 140. Such information includes execution results that are not yet in the GPR 118, and such path can be considered as a "bypass" path via 140. Although various paths are depicted as separate paths, it will be understood that paths can be combined within the scope of the invention.

If there is no tracking of the GPR updates (register number and value) through the processor pipeline, no early bypassing of results is possible. As a result, the dependency stage of a consumer (i.e., victim) instruction is delayed in Instruction Dispatch 106 until the updated register data is written back and accessible from the GPR 118 as illustrated in FIG. 2.

The present invention is described for an in-order processor where a data cache 112 can return two (2) sets of sixteen (16) bytes of consecutive data within the same line, one set from each of two (2) lookup pipelines. The present invention solves problems of the prior art by providing Operand Fetching, Register Tracking and AGI bypassing and synchronization in the processor.

Now consider operand fetching. Variants of LM-type instructions require special operand fetch access routines (algorithms) to process the instructions. In an exemplary embodiment, implementation of algorithms are located in the address generator and operand fetching unit 108. To provide a steady, predictable flow of data, two separate fetch routines may be used. In one embodiment, the two separate fetch routines include one routine for 32-bit return variants and one routine for sixty four (64) bit (i.e., double-word) return variants.

Referring now to FIG. 3, there is shown an illustration of this pattern for the thirty two (32) bit load multiple instruction where the return sequence to the execution unit 114 is double word (8 bytes) of data each cycle, except the final cycle, which can be for one (1) or two (2) words (double word or four (4) bytes) of data depending on the number (even or odd) of registers being loaded. Accordingly, this pattern corresponds to the pair of equivalent register updates that occur downstream, with the final cycle of data return matching the final one (1) or two (2) register updates. To support this rate of return, the fetching pattern illustrated in FIG. 3 is used. In this pattern, S refers to the starting address of the load multiple instructions operand data. Simply (re)fetching data, that was already obtained from prior fetches, every cycle is avoided for performance and power-saving related-reasons in the data cache 112. Each fetch yields sixteen (16) bytes (128 bits), or a quadword (QW) of Data. The data corresponding to each fetch is buffered for later use across three (3) QW-sized internal registers, allowing OpFetch to avoid fetching data every cycle. To conserve buffer space, and to prevent buffer overflows, the teachings make use of gap cycles to "make room" in the buffer for additional fetch data. Thus, it is not necessary to prefetch the entire operand in four consecutive cycles.

For the 64-bit LMG variant, for performance reasons, the fetch pattern and return rate vary throughout the instruction as illustrated in FIG. 4. In FIG. 4, S refers to the starting address of the LMG's operand data. LMG differs from LM in that only one (1) register will be updated every cycle for the first four (4) cycles, then two (2) registers will be updated every cycle thereafter except for the last cycle where there may only be one (1) register updated if the total number of registers is odd. To facilitate the enhanced performance boosting speed of fetch cycles 5-10, two processor pipes (each includes a LSU pipe that can access the data cache) are bound together, and are used both for fetching and returning operand data for the LMG through the LSU 110 to the execution Unit 114.

Now consider register tracking and AGI bypassing. In some embodiments, the LM-type instructions load a number (N) of GPRs in order from a starting register $R_1$ to $R_3$, where N ranges from 1 to the maximum number of GPRs in the processor. For the 32-bit LM, the defined fetching sequence supports the update of up to two GPRs per cycle. Results of this support along with the performance/throughput improvements afforded by the invention is illustrated in FIG. 5 for a seven (7) register LM. For the 64-bit LMG, the defined fetching sequence supports the update of one (1) GPR for the first four (4) cycles then up to two GPRs per cycle for the remainder. FIG. 6 shows an example of this and associated performance benefits.

Now consider synchronization. An additional complication is the need for the register tracking and AGI bypass mechanism to remain in lock-step with Operand Fetching and data return. Through synchronization, Operand Fetching will stall whenever the data cache is in a busy state, and thus, a duplicate mechanism is maintained in the register tracking and AGI bypass mechanism through the Synchronization Mechanism 120. Therefore the predefined pattern is maintained across the Operand Fetching and AGI logic in spite of asynchronous stall activity. In an exemplary embodiment, the synchronization mechanism 120 communicates with and synchronizes the Instruction Grouping 102, Dispatching 106, Address Generation and Operand Fetching 108 and Load Store 110 Units.

Technical effects and benefits include provision of pipelined processors that may implement instructions of the Load Multiple (LM) type to fetch a sequence of memory into a set of the General Purpose Registers (GPRs). These LM instructions may be part of the processor's generally (publicly) available ISA (Instruction Set Architecture). Enhancements to previously implemented LM-type instructions for the purposes of optimally enabling the resolution of Address Generation Interlock (AGI) dependencies are provided through AGI bypassing without the use of costly early register files. In a pipelined processor, the register range is processed from beginning to end with a wrap as necessary on the total number of registers. Each cycle the "current" register is incremented through the range at a rate determined by the fetching pattern. These register numbers are tracked through the execution/bypass pipeline and in the event that a dependent instruction requires the contents of one of the registers the bypass paths are set up based on the current pipeline stage of the required register values.

In various embodiments, the AGI stage does not contain result registers. Rather, it tracks register updates through the pipeline (via intended GPR number) and uses that to determine and interlock on RAW dependencies. Further, the invention provided herein does not make use of costly (area and complexity-wise) early register files as do some of the known solutions. That is, in some regards, an early register file may be considered an "image" (located closer, both in physical distance and cycles) of the GRP file this is written and accessed earlier. In contrast, other solutions included just tracking that there is an outstanding register update and removing the "lock" once the register is written. This allows the interlock, but no bypass can be allowed as the actual location of the result is not known other than that a register update is pending.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A pipelined processor for supporting an address generation interlocking architecture, the processor comprising:
   an instruction grouping unit configured to detect a read-after-write dependency and to resolve instruction interdependency;
   an instruction dispatch unit (IDU) including address generation interlock (AGI) and operand fetching logic configured to dispatch an instruction to at least one of a load store unit and an execution unit;
   wherein the load store unit is configured with access to a data cache and to return fetched data to the execution unit;
   wherein the execution unit is configured to write data into a general purpose register bank; and
   wherein the architecture provides support for bypassing of results of a load multiple instruction for address generation while such instruction is executing in the execution unit before the general purpose register bank is written.

2. The processor of claim 1, wherein the operand fetching logic is further configured to implement a predictable data return sequence for the load multiple instruction.

3. The processor of claim 1, wherein the processor further comprises control logic for the address generation interlock the control logic configured to track pending register updates, through each of the pipeline stages up to writeback to a general purpose register in the general purpose register bank, based on a predefined data return pattern.

4. The processor of claim 1, wherein tracked register updates are available for bypassing into an address generation stage of a dependent instruction.

5. The processor of claim 1, wherein a load multiple instruction is dispatched in one cycle 6. The processor of claim 5, wherein a load multiple instruction is not cracked by one of software and decode hardware into N separate load instructions with corresponding operand accesses.

7. The processor of claim 1, wherein at least one of the operand fetching logic and a register are configured to update tracking logic are responsive to broadcasted pipeline stalls to maintain synchronization.

8. The processor of claim 7, wherein the processor further comprises synchronization logic configured to monitor a state of the microprocessor to detect and broadcast the need for stalls in the fetching sequence.

9. A method for bypassing address generation interlocking (AGI) in a processor, the method comprising:
   at least one of detecting a read-after-write dependency and resolving instruction interdependency;
   dispatching a load multiple instruction;
   accessing a data cache in response to the dispatching;
   returning fetched data from the data cache;
   writing the fetched data into a general purpose register bank; and
   bypassing result data from the load mutiple instruction to satisfy address generation dependencies, the bypassing while the load mutiple instruction is executing and before writing the fetched data into the general purpose register bank.

10. The method of claim 9, further comprising implementing a predictable data return sequence for the load multiple instruction.

11. The method of claim 9, further comprising registering the fetched data based on a predefined data return pattern.

12. The method of claim 9, further comprising tracking register updates and making the tracking available for bypassing into an address generation stage of a dependent instruction.

13. The method of claim 12, further comprising dispatching the load multiple instruction in one cycle.

14. A computer program product for bypassing address generation interlocking (AGI) in a processor, the computer program product comprising:
   a tangible storage medium readable by a processing circuit and storing instructions for execution by the processing circuit for performing a method comprising:
   at least one of detecting a read-after-write dependency and resolving instruction interdependency;
   dispatching a load multiple instruction;
   accessing a data cache in response to the dispatching;
   returning fetched data from the data cache;
   writing the fetched data into a general purpose register bank; and
   bypassing result data from the load multiple instruction to satisfy address generation dependencies, the bypassing while the load multiple instruction is executing and before writing the fetched data into the general purpose register bank.

15. The computer program product of claim 14, wherein the method further comprises implementing a predictable data return sequence for the load multiple instruction.

16. The computer program product of claim 14, wherein the method further comprises registering the fetched data based on a predefined data return pattern.

17. The computer program product of claim 14, wherein the method further comprises tracking register updates and making the tracking available for bypassing into an address generation stage of a dependent instruction.

18. The computer program product of claim 14, wherein the method further comprises dispatching the load multiple instruction in one cycle.

* * * * *